May 19, 1936.    S. B. DALLAS    2,041,051

JOINTING OF MUNTIN OR CROSS BARS

Filed July 16, 1934

Inventor
SAMUEL B. DALLAS.

By Howard J. Whelan.
Attorney

Patented May 19, 1936

2,041,051

UNITED STATES PATENT OFFICE 2,041,051

JOINTING OF MUNTIN OR CROSS BARS

Samuel B. Dallas, Baltimore, Md.

Application July 16, 1934, Serial No. 735,533

3 Claims. (Cl. 287—51)

This invention refers to metal windows and their construction and more particularly to the jointing of muntin or cross bars. It has among its objects to provide for the jointing of metal windows and the like in a manner that will provide a positive lock at the joint that will not loosen or become weak; another object is to have the joint such that it will be practically as strong as by welding without having the drawbacks of the latter processing; a further object is to have the process of making the joint such that it will straighten the parts at the joint and overcome the defects of manufacturing processes which are frequently caused in the appearance and surfaces of the material used for the joints; and a still further object is to have the joint such that it may be formed together with the stamping and pressing machinery in a comparatively simple and effective manner. Other objects will become apparent as the invention is more fully set forth.

In the construction of metal windows and the like having standard bar construction or sections having web and flanges of different standard types, difficulty arises in making the joints because of the necessity of using angle plates, welding or cutting away portions of the sections. The angle-plate method is clumsy and undesirable; the welding processes affect the metal, cause lumps and built-up blisters and require additional labor afterwards to remove excess or protruding material. The cutting-away process is frequently undesirable because of the open joints and dependence on friction to keep the muntin or cross bars together, and the tendency to permit breakage if unduly bent. In this invention, these difficulties are avoided, the metal is cut away to fit its corresponding cross bar, and in such a manner as to permit an easy insertion and positioning, and with the cuts beveled, dovetailed or angularly made where desirable. After positioning, the metal is struck by machine process, smoothed out and the metal flowed cold to fit practically homogeneously together and into the dovetails mentioned, so that the metal of one part is locked positively into the other. At the same time the metal is mechanically punched or indented at one location to provide material for the flow of the cold metal to another location without causing stresses and strains that might render breakage likely.

In the construction shown in the drawing, which indicates an embodiment of this invention:

Similar reference characters refer to similar parts throughout the drawing.

Figure 1:
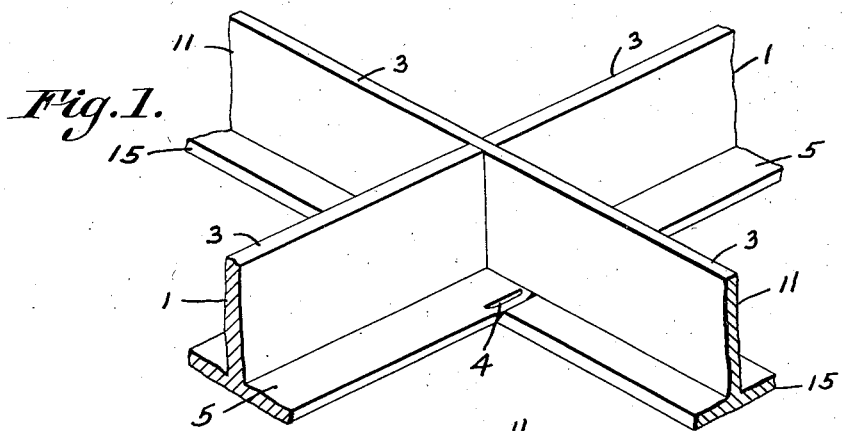
Figure 1 is a perspective view of a joint in a muntin T-bar construction indicating the manner of jointing outlined in this invention.
Figure 2:
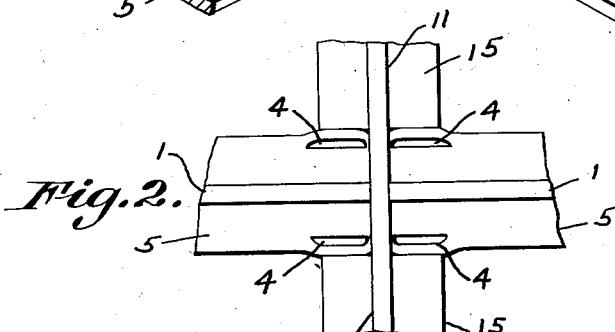
Figure 2 is a plan view of a joint in a muntin T-bar construction showing the manner of jointing outlined in this invention.
Figures 3, 4:
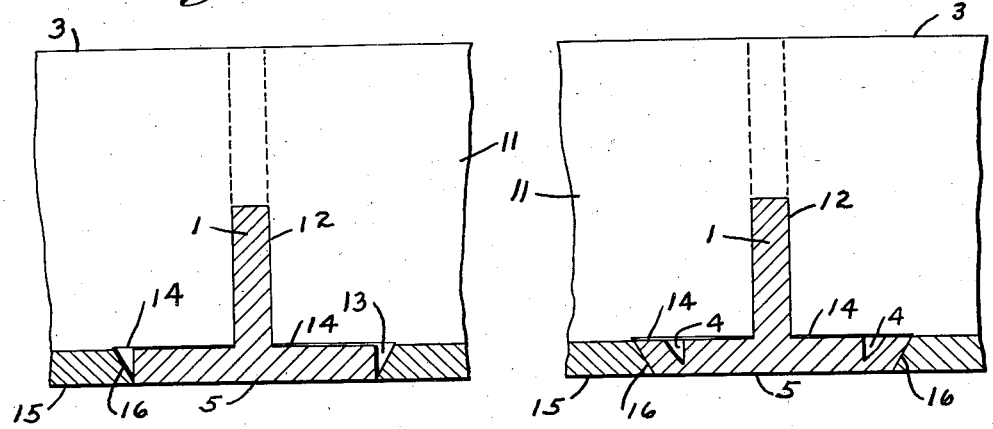
Figure 3 is a sectional view of the muntin T-bars in place before swaging.
Figure 4 is a sectional view of the muntin T-bars permanently locked in position after swaging.
Figure 5:
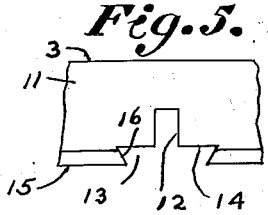
Figure 5 is a detail of cut shown in one of cross bars, making the joint shown in Figure 1.
Figure 6:
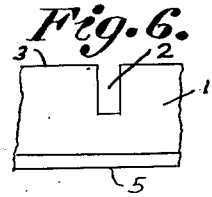
Figure 6 is a detail of cut shown in other cross bar, making the joint shown in Figure 1.

The construction of the joint is preferably arranged with a T-bar section cut on the web 1 with a square cut slot 2 extending through about one-half the length of the web from its edge 3. On this part of the T-bar are suitably located depressions 4 provided in the flange 5. The second section is provided with a web 11 with its flange 15, the latter being cut-away at 13 and into a portion of the web at 14 as indicated. The sides of the cut-away portion 16 are cut slantingly or dovetailed so that the inner width is larger than the entering width as is apparent in the drawing. A slot 12 rises into the web from the flange to about one-half the web and is arranged to allow the joint to be made with the other T-bar at right angles to each other as shown in the drawing. After the T-bars are joined together, they are placed in a press which brings the two T-bars together. The press follows with a die that indents the flanges at 4, and then forces the material in the flange 5 where it is adjacent into the dovetailed portion at 13 and 14 so that it fills up the space and against the sides 16 and makes the connection at the flanges and web practically homogeneous as the material is swaged in place. After being so swaged the joint is positively locked without raising any objectionable bumps and all spaces on the lines of the joint are filled with material under pressure. The indentations provide for the swaging in a manner that will direct the flow of material and avoid cracks and pulls on the T-bars that might encourage breaking or weakness about the joint. Under the pressure of the press the material of the joint, including the webs and flanges, is pressed into the form and shape predetermined by the die made and used for it. All unevenness and variations from the proper shape are pressed out, so that the resulting joint is that desired and intended to be, and both cross-bars and joints become quasi-homogeneous. For convenience in referring to the surfaces of the T-bars, the portions of the surfaces that are inside the frame, which includes that where the depressions 4 are, and the webs 1, are termed the "inside" of the T-bars, while those surfaces which are outside of the joining portions and face outwardly are termed the "outside" portions or surfaces.

While but one form of the invention is shown in the drawing and as applied to T-bar construction, it is not desired to limit this application for patent to that particular form, or in any other way otherwise than limited by the prior art, as it is appreciated that other forms of construction could be used that would employ the same principles and come within the scope of the appended claims.

Having thus described the invention, what is claimed is:—

1. A joint of the class described comprising a plurality of interlocking T-bar structures with the webs slotted to permit the webs to interlock and butt up against each other and having the flanges cut-away and dovetailed on one structure and indented on the corresponding structure and the flanges swaged quasi-homogeneously into each other and into a dove-tailed lock without injuriously straining the material of the flange indented and flowed in said lock.

2. A metal window joint having a cross-bar of conventional T-cross section with a portion of the web and flange removed and the flange dovetailed, and another similar cross-bar having a slot in its web making said web bridge over the web in the first-mentioned cross-car and closely and quasi-homogeneously fit the same and its flange indented and swaged to flow and fit tightly and quasi-homogeneously into the flange portion removed and dovetailed in the first-mentioned cross-bar with the webs and flanges in flush registry with each other.

3. A muntin joint of the class described comprising in combination a conventional T-bar having a web flat and arranged perpendicularly to a flat plane flange at the middle portion thereof, said web having a slot with straight edges cut out of the same from the outside edge of the web and half-way towards the flange thereof, the slot being substantially the thickness of the flange, and another similar T-bar having its flange cut out to the approximate width of the flange of the first mentioned T-bar to receive same and the web slotted perpendicularly therefrom and bridging the web of the first mentioned T-bar adjacent to the aforesaid slot and indentations in the flange of the first mentioned T-bar swaging the flanges together, and the flanges and webs of the T-bars into the same flat plane and registered with each other substantially as described.

SAMUEL B. DALLAS.